(12) United States Patent
Tominaga et al.

(10) Patent No.: US 11,785,184 B2
(45) Date of Patent: Oct. 10, 2023

(54) MAINTENANCE SUPPORT SYSTEM, MAINTENANCE SUPPORT METHOD, AND PROGRAM

(71) Applicant: SPP TECHNOLOGIES CO., LTD., Tokyo (JP)

(72) Inventors: Yutaka Tominaga, Hyogo (JP); Takeshi Habe, Hyogo (JP); Norihiro Tsujioka, Hyogo (JP)

(73) Assignee: SPP TECHNOLOGIES CO., LTD., Tokyo (JP)

( * ) Notice: Subject to any disclaimer, the term of this patent is extended or adjusted under 35 U.S.C. 154(b) by 98 days.

(21) Appl. No.: 17/440,863

(22) PCT Filed: Mar. 22, 2019

(86) PCT No.: PCT/JP2019/012279
§ 371 (c)(1),
(2) Date: Sep. 20, 2021

(87) PCT Pub. No.: WO2020/194413
PCT Pub. Date: Oct. 1, 2020

(65) Prior Publication Data
US 2022/0165044 A1 May 26, 2022

(51) Int. Cl.
*H04N 7/18* (2006.01)
*G06T 7/70* (2017.01)
(Continued)

(52) U.S. Cl.
CPC ............ *H04N 7/183* (2013.01); *G06Q 10/20* (2013.01); *G06T 7/70* (2017.01); *G06T 11/00* (2013.01);
(Continued)

(58) Field of Classification Search
CPC . G06T 7/70; G06T 11/00; G06T 2207/10028; G06T 2207/30204
See application file for complete search history.

(56) References Cited

U.S. PATENT DOCUMENTS

2015/0138236 A1    5/2015   Koga
2017/0124338 A1*   5/2017   Oonishi ................ G09C 5/00
(Continued)

FOREIGN PATENT DOCUMENTS

JP    2012-054891    3/2012
JP    2017-211766    11/2017
(Continued)

*Primary Examiner* — Ryan R Yang
(74) *Attorney, Agent, or Firm* — Clark & Brody LP

(57) ABSTRACT

A maintenance support system includes a terminal including an imaging device, a device configured to identify a three-dimensional area TA including a maintenance target T with reference to a predetermined reference point, a device for identifying a position (vector A) of the imaging device in an initial state with respect to the reference point, a device for identifying a change of position (vector B) from the initial state of the imaging device, a device for identifying a position (vector C) of the reference point with reference to the imaging device in a post-movement state in which the terminal has moved, and identifying a pixel area corresponding to the three-dimensional area in a captured image, and a device for generating a processed image in which a portion other than the pixel area is made invisible. A communication device is provided for transmitting the processed image to a support terminal.

12 Claims, 4 Drawing Sheets

(51) Int. Cl.
*G06Q 10/20* (2023.01)
*G06T 11/00* (2006.01)
*G06V 10/25* (2022.01)
*G06V 10/22* (2022.01)

(52) U.S. Cl.
CPC .............. *G06V 10/22* (2022.01); *G06V 10/25* (2022.01); *G06T 2207/10028* (2013.01); *G06T 2207/30204* (2013.01)

(56) References Cited

U.S. PATENT DOCUMENTS

| | | | |
|---|---|---|---|
| 2017/0262817 A1* | 9/2017 | Mihara | ................ G06V 20/20 |
| 2019/0007562 A1 | 1/2019 | Sato | |
| 2020/0322506 A1 | 10/2020 | Ikegame et al. | |

FOREIGN PATENT DOCUMENTS

| | | |
|---|---|---|
| JP | 2019-012971 | 1/2019 |
| WO | 2014/016862 | 1/2014 |

\* cited by examiner

MAINTENANCE SUPPORT SYSTEM, MAINTENANCE SUPPORT METHOD, AND PROGRAM

TECHNICAL FIELD

The present invention relates to a maintenance support system, a maintenance support method, and a program for supporting maintenance work of a maintenance target such as industrial equipment. In particular, the present invention relates to a maintenance support system, a maintenance support method, and a program, which can prevent leakage of confidential information etc. excluding the maintenance target, and in which there are few restrictions on imaging conditions.

BACKGROUND ART

Conventionally, when a trouble occurs in industrial equipment such as a substrate processing apparatus, action taken generally in response thereto is such as follows: a maintenance worker who is at the installation site of the industrial equipment which is the maintenance target confirms the status of the trouble and then reports the status of the trouble by telephone to a maintenance supporter of the manufacturer of the maintenance target, and the maintenance supporter gives various instructions to the maintenance worker by telephone.

If the trouble cannot be solved even after the above-described action by telephone is taken, a further action is taken such that a skilled worker of the manufacturer is dispatched to the installation site of the maintenance target at a timing when the skilled worker is available.

In the case of the above-described action by telephone, since the communication is verbal communication, there is a case in which the status of the trouble may not be well communicated to the maintenance supporter, or the instruction of the maintenance supporter may not be well communicated to the maintenance worker, resulting in that the trouble cannot be solved. Although, the maintenance worker may send an obtained picture data of the maintenance target to the maintenance supporter by e-mail, etc., as needed, and the maintenance supporter checks the picture data to grasp the status of the trouble, a problem exists in that understanding the status takes time.

Further, in the case of the above-described action in which a skilled worker is dispatched, a problem exists in that taking immediate action is difficult.

To solve the above problems, there is proposed a maintenance support system in which a maintenance worker wears a wearable terminal including an imaging device and a head-mounted display, and an image of a maintenance target is captured by using the wearable terminal so that this captured image (video image) is transmitted to a support terminal operated by a maintenance supporter through a telecommunication line such as the Internet.

However, in the above-described maintenance support system, if the captured image is transmitted as it is to the support terminal, there is a risk that the captured image includes confidential information of the installation site. If the captured image including the confidential information is transmitted to the maintenance supporter side, the maintenance supporter can know the confidential information, thus causing a problem.

Accordingly, as a maintenance support system capable of preventing leakage of confidential information, for example, a maintenance support system according to Patent Literature 1 (an image processing system in Patent Literature 1) has been proposed.

The system according to Patent Literature 1 is an image processing system (claim 1 of Patent Literature 1) including: an acquisition unit that acquires an original image that captures an original area; a recognition unit that recognizes one or more identifiers in the original image; an identifying unit that identifies at least one of a first image portion which captures a first area of the original area and a second image portion that captures a second area which is an area of the original area excluding the first area, based on the one or more identifiers recognized at the recognition unit; and a generation unit that generates a processed image including the first image portion according to an identified result by the identifying unit.

According to the system described in Patent Literature 1, it is considered that leakage of confidential information etc. can be prevented by arranging such that the first area is the maintenance target, and the second area is confidential information etc. excluding the maintenance target.

However, the system described in Patent Literature 1 has a restriction that the original image must always include an identifier. Specifically, while Patent Literature 1 shows an example in which an internal area (a rectangular area surrounded by four identifiers 30) of a printing apparatus 300 is the maintenance target, and the original area varies according to the movement of a worker 10 who wears a wearable tool 100 including a camera 170 so that original images 171a to 173a that capture different original areas are acquired, it is stated that the identifier 30 must be included in each of the original images 171a to 173a (paragraphs 0063 to 0065, FIG. 6, and FIG. 7, etc. of Patent Literature 1).

Therefore, for example, when an attempt is made to capture an image of details of the maintenance target in close proximity to the maintenance target, a restriction occurs in that the maintenance target can be approached only within a range in which the identifier is included in the original image.

Further, since the system according to Patent Literature 1 is configured such that the first image portion (the portion corresponding to the maintenance target) is two-dimensionally identified with reference to the identifier, there is a restriction that the image of the maintenance target to which the identifier is bonded must be captured from a specific one direction opposed to the identifier.

CITATION LIST

Patent Literature

[Patent Literature 1] JP2017-211766A

SUMMARY OF INVENTION

Technical Problem

The present invention has been made to solve the above problems of conventional arts and has its object to provide a maintenance support system, a maintenance support method, and a program, which can prevent leakage of confidential information etc. excluding the maintenance target, and in which there are few restrictions on imaging conditions.

Solution to Problem

To solve the above problems, the present invention provides a maintenance support system comprising: a wearable terminal including an imaging device and worn by a maintenance worker; a first identifying device configured to identify a predetermined three-dimensional area including a maintenance target with reference to a predetermined reference point in a captured image acquired by capturing an image of the maintenance target with the imaging device in an initial state; a second identifying device configured to identify a position of the imaging device in the initial state with respect to the reference point; a third identifying device configured to identify a change of position from the initial state of the imaging device in a post-movement state in which the wearable terminal has moved; a fourth identifying device configured to identify a position of the reference point with reference to the imaging device in the post-movement state, based on the position of the imaging device in the initial state with respect to the reference point identified by the second identifying device and on the change of position from the initial state of the imaging device in the post-movement state identified by the third identifying device, and configured to identify an effective pixel area corresponding to the three-dimensional area in a captured image acquired by the imaging device in the post-movement state, based on the identified position of the reference point and on the three-dimensional area identified by the first identifying device; a processed-image generating device configured to generate a processed image in which a mask pixel area excluding the effective pixel area identified by the fourth identifying device is made invisible for the captured image acquired by the imaging device in the post-movement state; and a communication device configured to transmit the processed image generated by the processed-image generating device to a support terminal operated by a maintenance supporter.

According to the present invention, by a first identifying device, a predetermined three-dimensional area including a maintenance target is identified with reference to a predetermined reference point in captured image acquired by capturing an image of the maintenance target with the imaging device in an initial state. The "imaging device in an initial state" in the present invention means an imaging device in a state where the predetermined reference point is located in the captured image. Specifically, for example, when the reference point is defined by a marker attached to the maintenance target, the "imaging device in the initial state" means an imaging device located at a position where it can capture and identify the marker.

Next, according to the present invention, a position of the imaging device in the initial state with respect to the reference point is identified by a second identifying device. That is, a distance and a direction from the reference point of the imaging device in the initial state are identified. Specifically, for example, when the reference point is defined by the marker attached to the maintenance target, from which position the imaging device in the initial state has captured the image of the marker is identified with reference to the reference point defined by the marker.

Next, according to the present invention, a change of position from the initial state of the imaging device is identified by a third identifying device in a post-movement state in which the wearable terminal has moved. When the maintenance worker moves, the wearable terminal worn by the maintenance worker also moves, and the imaging device included in the wearable terminal also moves. At this time, the change of position from the initial state of the imaging device in the post-movement state is to be identified by the third identifying device.

Next, according to the present invention, first, a position of the reference point with reference to the imaging device in the post-movement state is identified by a fourth identifying device based on the position of the imaging device in the initial state with respect to the reference point identified by the second identifying device, and on the change of position from the initial state of the imaging device in the post-movement state identified by the third identifying device. Specifically, assuming that the position of the imaging device in the initial state with respect to the reference point identified by the second identifying device is a vector A that starts from the reference point, and that the change of position from the initial state of the imaging device in a post-movement state identified by the third identifying device is a vector B that starts from the imaging device in the initial state, a position of the imaging device in the post-movement state with reference to the reference point is represented by a composite vector of the vector A and the vector B. Therefore, the position of the reference point with reference to the imaging device in the post-movement state is identified as an inverse vector C of the above-described composite vector.

Then, an effective pixel area corresponding to the three-dimensional area in the captured image acquired by the imaging device in the post-movement state is identified by the fourth identifying device based on the identified position of the reference point (that is, the above-described inverse vector C with reference to the imaging device in the post-movement state) and on the three-dimensional area identified by the first identifying device. Specifically, first, the three-dimensional area with reference to the imaging device in the post-movement state is identified based on the identified position of the reference point (inverse vector C), and on the three-dimensional area identified by the first identifying device the three-dimensional area with reference to the reference point). In other words, the three-dimensional area represented by a three-dimensional coordinate system with reference to the reference point will be represented by a three-dimensional coordinate system with reference to the imaging device in the post-movement state. In which portion of the field of view of the imaging device in the post-movement state, the three-dimensional area represented by the three-dimensional coordinate system with reference to the imaging device will appear, in other words, to which pixel area in the captured image acquired by the imaging device, the three-dimensional area corresponds can be identified by geometrical calculation, so that the effective pixel area corresponding to the three-dimensional area in the captured image can be identified. Then, there is no need of the reference point being included in the captured image acquired by the imaging device in the post-movement state.

Next, according to the present invention, a processed image in which a mask pixel area excluding the effective pixel area identified by the fourth identifying device is made invisible is generated by a processed-image generating device. Examples of "a processed image in which a mask pixel area is made invisible" in the present invention include an image in which although the reflected area is the same area as in the captured image, the mask pixel area in the captured image is dark filled, and an image in which only the effective pixel area is cut out from the captured image. Since the three-dimensional area includes the maintenance target, and the effective pixel area corresponds to the three-dimensional area, the pixel area corresponding to the confidential information etc. excluding the maintenance target will not be included in the processed image in which the mask pixel area excluding the effective pixel area is made invisible, as long as the three-dimensional area will not be set to be excessively larger than the maintenance target.

Finally, according to the present invention, the processed image generated by the processed-image generating device is transmitted to the support terminal by a communication device. Therefore, in the support terminal, only the maintenance target included in the three-dimensional area corresponding to the effective pixel area is visually recognized, so that leakage of the confidential information etc. excluding the maintenance target can be prevented.

As described so far, according to the present invention, it is only necessary that a reference point is included in a captured image acquired by the imaging device in an initial state, and there is no need that the reference point is included in a captured image acquired by the imaging device in a post-movement state in which the wearable terminal has moved. Moreover, according to the present invention, since a predetermined three-dimensional area including a maintenance target is identified, there is no restriction on the imaging direction of the imaging device. Therefore, it is possible to prevent leakage of confidential information etc. excluding the maintenance target, and there are few restrictions on the imaging conditions.

Note that in the present invention, "a post-movement state in which the wearable terminal has moved" is a concept that includes a case in which moving amount is 0 (that is, a case in which the imaging device is in an initial state). Therefore, in the processed-image generating device, a processed image in which the mask pixel area is made invisible is to be generated even for a captured image acquired by the imaging device in the initial state.

In the present invention, preferably, the reference point is not necessarily included in the captured image acquired by the imaging device in the post-movement state.

Preferably, the reference point is defined by a marker attached to the maintenance target.

Specifically, for example, a center point of a pixel area corresponding to a marker in a captured image is defined as a reference point. Examples of the marker include an AR marker, a QR code (registered trademark), a bar code, and the like. Moreover, examples of the method of attaching a marker to a maintenance target include bonding as well as printing, imprinting, and the like.

Preferably, the second identifying device identifies a position of the imaging device in the initial state with respect to the reference point, based on a size, position and shape of a pixel area corresponding to the marker in the captured image acquired by the imaging device in the initial state.

If a distance of the imaging device in the initial state with respect to the marker changes, the size of the pixel area corresponding to the marker in the captured image acquired by the imaging device changes. Moreover, if a direction of the imaging device in the initial state with respect to the marker (a direction of a straight line connecting the marker with the center of an imaging element group of the imaging device) changes, the position and the shape of the pixel area corresponding to the marker in the captured image acquired by the imaging device will change. Therefore, in the above-described preferable configuration, if correlation (calibration curve) between the size of the pixel area corresponding to the marker and the distance of the imaging device, and correlation (calibration curve) between a characteristic quantity regarding the position and the shape of the pixel area corresponding to the marker and the direction of the imaging device are investigated in advance and stored in the second identifying device, it is possible to identify the position (distance and direction) of the imaging device in the initial state with respect to the reference point based on these correlations and the size, position, and shape of the pixel area corresponding to the marker in the captured image.

Note that as the characteristic quantity regarding the shape of the pixel area corresponding to the marker, it is possible to use various characteristic quantities which reflect the way in which the marker appears differently depending on the direction of the imaging device and which can be calculated by well-known image processing, such as an aspect ratio (when the marker is a rectangle) and a circularity (when the marker is a circle) of the pixel area corresponding to the marker.

Preferably, the second identifying device includes a range image sensor attached to the wearable terminal and having a substantially same line-of-sight direction as the imaging device, and identifies a position of the imaging device in the initial state with respect to the reference point based on a gray level, position and shape of a pixel area corresponding to the marker in a range image acquired by the range image sensor.

A range image sensor (also referred to as a depth camera and a 3D camera) is a sensor that measures distance to an object in a field of view by a TOF (Time Of Flight) scheme, for example, and acquires a range image in which the distance to the object is represented by a gray level of each pixel.

If a distance of the imaging device in the initial state with respect to the marker changes, a distance of the range image sensor with respect to the marker also changes in a similar fashion. If the distance of the range image sensor with respect to the marker changes, the gray level of the pixel area corresponding to the marker in the range image acquired by the range image sensor changes. Moreover, if a direction of the imaging device in the initial state with respect to the marker changes, a direction of the range image sensor with respect to the marker also changes in a similar fashion. If the direction of range image sensor with respect to the marker changes, the position and shape of the pixel area corresponding to the marker in the range image acquired by the range image sensor changes. Therefore, in the above-described preferable configuration, if correlation (calibration curve) between the gray level of the pixel area corresponding to the marker in the range image and the distance of the imaging device, and correlation (calibration curve) between a characteristic quantity regarding the position and the shape of the pixel area corresponding to the marker in the range image and the direction of the imaging device are investigated in advance and stored in the second identifying device, it is possible to identify the position (distance and direction) of the imaging device in the initial state with respect to the reference point based on the correlations and the gray level, position and the shape of the pixel area corresponding to the marker in the range image.

Note that in order to identify the position of the imaging device in the initial state with respect to the reference point defined by the marker, it is also possible to use the AR development library "ARToolKit" manufactured by M.SOFT Co., Ltd. as the second identifying device.

Specifically, as a marker, a parallelogram (including a square and a rectangle) marker is used. Then, "ARToolKit" is used for the captured image acquired by capturing an image of the marker to create a surface of a quadrangular pyramid including four sides of the marker. Next, with "ARToolKit", the intersection vector of facing faces of the quadrangular pyramid is obtained, and the normal direction with respect to the marker surface is calculated based on the outer product of these intersection vectors, so that it is possible to identify the position of the imaging device in the initial state with respect to the reference point defined by the marker.

Preferably, the third identifying device includes an inertial sensor attached to the wearable terminal.

The inertial sensor is, for example, a sensor constituted by a triaxial acceleration sensor and a triaxial angular velocity sensor (gyro sensor).

Therefore, in the above-described preferable configuration, it is possible to detect the acceleration and angular velocity of the wearable terminal by an inertial sensor. In other words, it is possible to detect the acceleration and angular velocity of the imaging device included in the wearable terminal. By using this detection result by the inertial sensor, the third identifying device can identify the change of position from the initial state of the imaging device in the post-movement state.

Preferably, the wearable terminal includes a head-mounted display, and the head-mounted display is configured to be switchable between a state where the captured image is displayed on the head-mounted display and a state where the processed image is displayed in a visually recognizable manner on the head-mounted display.

According to the above-described preferable configuration, in a state where the captured image is displayed on the head-mounted display, since there is no portion that obstructs the field of view of the maintenance worker unlike the case where the processed image in which the mask pixel area is dark filled is displayed, it is possible to perform maintenance work safely. Note that "a state where a captured image is displayed" in the above-described preferable configuration is a concept including a state where a captured image acquired by the imaging device is actually displayed on the head-mounted display, like on an MR headset (a state where the maintenance worker visually recognizes the displayed captured image), as well as a state where the head-mounted display is transmission type like a transmission type AR headset, and the maintenance worker can visually recognize the maintenance target directly via the transmission-type head-mounted display on which nothing is displayed.

On the other hand, according to the above-described preferable configuration, in a state where a processed image is displayed on the head-mounted display in a visually recognizable manner, the maintenance worker can also recognize the processed image transmitted to the support terminal. Therefore, the maintenance worker can also confirm that leakage of the confidential information, etc. excluding the maintenance target is prevented, which gives a sense of relief to the maintenance worker. Note that "a state where a processed image is displayed in a visually recognizable manner" in the above-described preferable configuration includes: a state where the same image as the processed image transmitted to the support terminal (such as an image in which although the reflected area is the same area as in the captured image, the mask pixel area in the captured image is dark filled, and an image in which only the effective pixel area is cut out from the captured image) is displayed, as well as a state where an image in which a boundary line between the mask pixel area and the effective area is overlaid on the captured image is displayed, and a state where the processed image is reduced in size to be displayed on a portion (for example, a corner) of the display screen.

Preferably, the first identifying device, the second identifying device, the third identifying device, the fourth identifying device, the processed-image generating device, and the communication device are attached to the wearable terminal.

According to the above-described preferable configuration, all of each device for executing a series of operations from generating a processed image in which a mask pixel area is made invisible in a captured image acquired by capturing an image of the maintenance target with the imaging device, until transmitting the processed image to the support terminal, are attached to the wearable terminal. This is a configuration of an inside-out scheme in which the position of the wearable terminal (imaging device) is detected by a sensor (a second identifying device and a third identifying device) attached to the wearable terminal itself. In the case of a configuration of an outside-in scheme in which the position of the wearable terminal is detected by using an external device separate from the wearable terminal (for example, a configuration in which the position of the wearable terminal (or the position of the imaging device included in the wearable terminal) is detected by using an imaging device which is externally installed separate from the imaging device included in the wearable terminal), although there is an advantage that power consumption needed for the wearable terminal is reduced, there are drawbacks such as environmental restrictions such as non-existence of a shielding object between the external device and the wearable terminal, and high cost caused by the need of a high precision external device. Therefore, by adopting the above-described preferable configuration, it is possible to achieve advantages of lower cost and fewer environmental restrictions.

Preferably, the present invention further includes the support terminal, wherein the support terminal is configured to be capable of bidirectional data communication with the communication device.

According to the above-described preferable configuration, since the support terminal and the communication device are capable of conducting bidirectional data communication, not only it is possible to transmit processed image from the communication device to the support terminal, but also it is possible to perform effective maintenance work by solely using the maintenance support system according to the present invention, such as transmitting image for maintenance work from the support terminal to the communication device, and transmitting voice data instructing the contents of the maintenance work.

Note that in addition to the above-describe preferable configuration, if the configuration is made such that data communication is enabled from a maintenance target (for example, industrial equipment, such as a substrate processing apparatus) to the support terminal, and if for example, process log data obtained at the maintenance target (measurement values and setting values concerning the process of the maintenance target) is transmitted to the support terminal, the maintenance supporter can instruct contents of maintenance work while referring to these process log data, and perform further effective maintenance work.

The maintenance target in the present invention is preferably industrial equipment such as a substrate processing apparatus.

To solve the above problems, the present invention also provides a maintenance support method by use of a wearable terminal including an imaging device and worn by a maintenance worker, the maintenance support method including: a first identifying step of identifying, by a first identifying device, a predetermined three-dimensional area including a maintenance target with reference to a predetermined reference point in a captured image acquired by capturing an image of the maintenance target by the imaging device in an initial state; a second identifying step of identifying, by a second identifying device, a position of the imaging device in the initial state with respect to the reference point; a third identifying step of identifying, by a third identifying device, a change of position from the initial state of the imaging device in a post-movement state in which the wearable terminal has moved; a fourth identifying step of identifying: by a fourth identifying device, a position of the reference point with reference to the imaging device in the post-movement state, based on the position of the imaging device in the initial state with respect to the reference point identified in the second identifying step, and on the change of position from the initial state of the imaging device in the post-movement state identified in the third identifying step; and identifying an effective pixel area corresponding to the three-dimensional area in a captured image acquired by the imaging device in the post-movement state, based on the identified position of the reference point and on the three-dimensional area identified in the first identifying step; a processed-image generating step of generating, by a processed-image generating device, a processed image in which a mask pixel area excluding the effective pixel area identified in the fourth identifying step is made invisible for the captured image acquired by the imaging device in the post-movement state; and a communication step of transmitting the processed image generated in the processed-image generating step to the support terminal operated by a maintenance supporter, by a communication device.

Further, to solve the above problems, the present invention also provides a program for causing the first identifying device, the second identifying device, the third identifying device, the fourth identifying device, the processed-image generating device, and the communication device to respectively execute the first identifying step, the second identifying step, the third identifying step, the fourth identifying step, the processed-image generating step, and the communication step included in the maintenance support method.

The present invention can also be provided as a computer (CPU) readable storage medium in which the program is stored.

Advantageous Effects of Invention

According to the present invention, it is possible to achieve effects of preventing leakage of confidential information, etc. excluding the maintenance target, and imposing few restrictions on imaging conditions.

DESCRIPTION OF EMBODIMENTS

Hereinafter, a maintenance support system according to an embodiment of the present invention will be described with reference to the appended drawings.

Figure 1A:
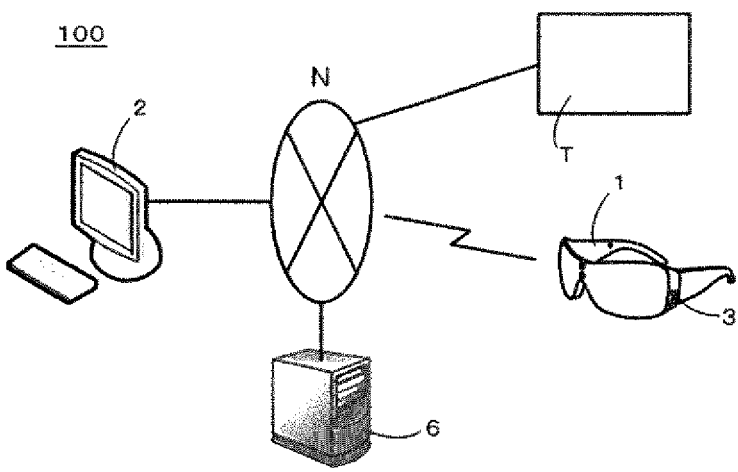
FIGS. 1A to 1C are diagrams to schematically show an outline configuration of a maintenance support system according to a first embodiment of the present invention.
Figure 1B:
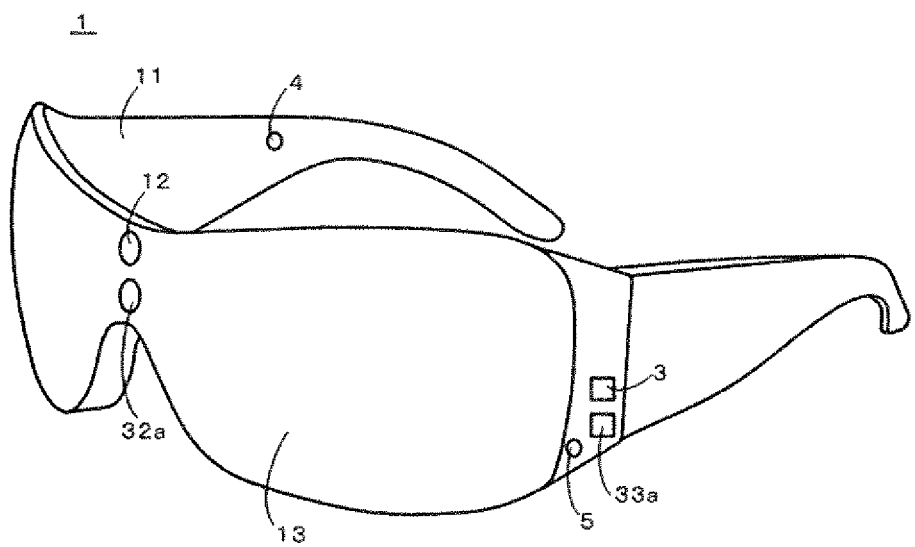
Figure 1C:
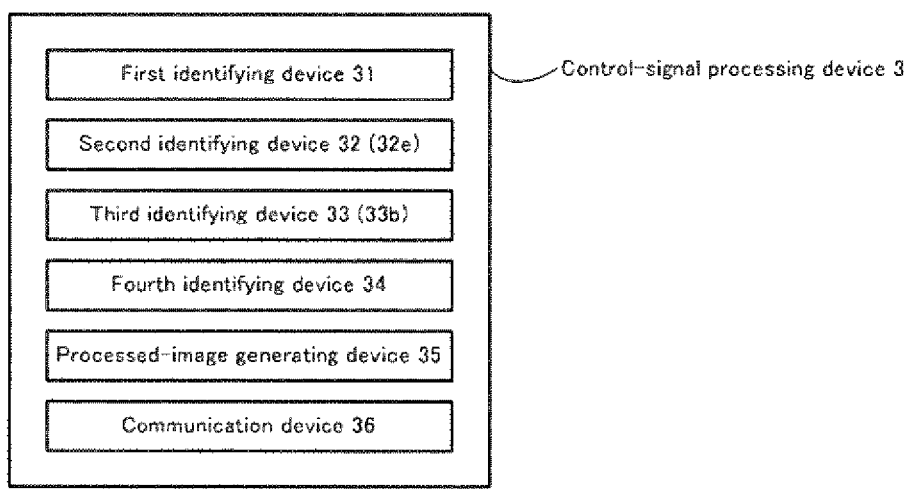

FIGS. 1A to 1C are diagrams to schematically show an outline configuration of a maintenance support system according to the present embodiment. FIG. 1A is a general configuration diagram, FIG. 1B is a diagram showing a wearable terminal and components attached thereto, and FIG. 1C is a block diagram showing the internal structure of a control-signal processing device shown in FIG. 1B.

As shown in FIG. 1A, a maintenance support system 100 according to the present embodiment includes a wearable terminal 1, a support terminal 2, and a control-signal processing device 3.

The wearable terminal 1 is a terminal worn by a maintenance worker who performs maintenance work at the installation site of a maintenance target (industrial equipment such as a substrate processing apparatus, and the like).

As shown in FIG. 1B, the wearable terminal 1 of the present embodiment is a glasses-type wearable terminal, and includes a frame 11 that a maintenance worker puts on his/her ears. The wearable terminal 1 also includes imaging device 12 at the middle of the front side of the frame 11 (a position corresponding to the vicinity of the middle of forehead of a maintenance worker when the maintenance worker puts the frame 11 on his/her ears). A color (RGB) camera is used as the imaging device 12 of the present embodiment. The line-of-sight direction of the imaging device 12 is set to be substantially parallel with the line-of-sight direction of the maintenance worker when the maintenance worker puts the frame 11 on his/her ears. Further, the wearable terminal 1 includes a head-mounted display 13 which is attached to the front side of the frame 11 and covers the front field of view of the maintenance worker when the maintenance worker puts the frame 11 on his/her ears. As the head-mounted display 13 of the present embodiment, one of a transmission type is used. Therefore, when nothing is displayed on the head-mounted display 13, it can be used in the same manner as with ordinary glasses.

As shown in FIG. 1B, a range image sensor 32a having substantially the same line-of-sight direction as the imaging device 12 is attached to the wearable terminal 1 of the present embodiment. Specifically, the range image sensor 32a is attached below the imaging device 12 at the middle of the front side of the frame 11. As the range image sensor 32a, a range image sensor of a TOF scheme is used, for example. Note that the range image sensor 32a constitutes a hardware portion of the second identifying device 32 to be described later.

Further, an inertial sensor 33a is attached to the wearable terminal 1 of the present embodiment. Specifically, the inertial sensor 33a is attached to the side of the frame 11. The inertial sensor 33a includes a triaxial acceleration sensor and a triaxial angular velocity sensor. Note that the inertial sensor 33a can be used as a hardware portion of the third identifying device 33 to be described later.

Further, a speaker 4 and a microphone 5 are attached to the side of the frame 11 of the wearable terminal 1 of the present embodiment.

The wearable terminal 1 having the above-described configuration can be constructed by using, for example, "HoloLens", which is smart glasses manufactured by Microsoft Corporation, and improving the same.

The support terminal 2 is electrically connected to the wearable terminal 1 (specifically, the control-signal processing device 3 attached to the wearable terminal 1) through a telecommunication line N such as the Internet. The support terminal 2 is configured to be capable of bidirectional data communication with the communication device 36 to be described later. As the support terminal 2, for example, a desktop-type computer can be used, but without being limited to this, various terminals such as laptop computers, tablet computers, smartphones, etc. can be used as far as they can display processed images as described below.

Note that the support terminal 2 of the present embodiment is electrically connected to a maintenance target T as well through the telecommunication line N, though this is not essential configuration. Specifically, for example, a computer (not shown in FIG. 1A) that collects process log data of the maintenance target T (measurement values and setting values related to the process of the maintenance target T) is provided, and this computer is electrically connected to the support terminal 2 through the telecommunication line N. Thus, configuration is made such that the process log data obtained at the maintenance target T is sequentially transmitted to the support terminal 2 and is stored in the support terminal 2.

Further, the support terminal 2 of the present embodiment is electrically connected to the wearable terminal 1 and/or the maintenance target T via a server 6 electrically connected to the telecommunication line N, though not essentially required. By providing the server 6, it becomes easy to manage the ID (identification information) and the usage history, of the wearable terminal 1 and the maintenance target T which are connected to the support terminal 2.

The control-signal processing device 3, which is attached to the wearable terminal 1 (on the side of the frame 11), is electrically connected to each component of the imaging device 12, the head-mounted display 13, a range image sensor 32a, an inertial sensor 33a, the speaker 4 and the microphone 5, and has functions of controlling each component and processing the output signal of each component.

The control-signal processing device 3 is mainly composed of a CPU, a memory such as a ROM and a RAM, and a program stored in the memory and causing the CPU to execute the operation to be described later.

As shown in FIG. 1C, the control-signal processing device 3 includes a program for causing the CPU to execute the operation as the first identifying device 31, a program for causing the CPU to execute the operation of the software portion 32b of the second identifying device 32, a program for causing the CPU to execute the operation of the software portion 33b of the third identifying device 33, a program for causing the CPU to execute the operation as the fourth identifying device 34, and a program for causing the CPU to execute the operation as the processed-image generating device 35. Further, the control-signal processing device 3 includes a communication device 36. The communication device 36 is composed of an antenna, a program for operating the antenna, and the like.

Updating of the program as described above may be performed by directly connecting a predetermined computer with the control-signal processing device 3 through a USB cable or the like, or may be performed by updating directly from the server 6.

In the present embodiment, all of the first identifying device 31, the second identifying device 32 (the range image sensor 32a, the software portion 32b), the third identifying device 33 (the inertial sensor 33a, the software portion 33b), the fourth identifying device 34, the processed-image generating device 35, and the communication device 36 are attached to the wearable terminal 1. As described later, this is a configuration of an inside-out scheme in which the position of the wearable terminal 1 (imaging device 12) is detected by a sensor attached to the wearable terminal 1 itself. Specifically, owing to this configuration of the inside-out scheme in which the position of the wearable terminal 1 (imaging device 12) in the initial state is identified by the second identifying device 32, and changes in the position of the wearable terminal 1 (imaging device 12) is identified by the third identifying device 33, it is possible to achieve advantages of lower cost and fewer restrictions on the environment.

Hereinafter, operation (maintenance support method) of the maintenance support system 100 according to the present embodiment having the outline configuration described above will be described with reference to FIGS. 2, 3A, 3B, 4A, 4B, in addition to FIGS. 1A to 1C.

Figure 2:
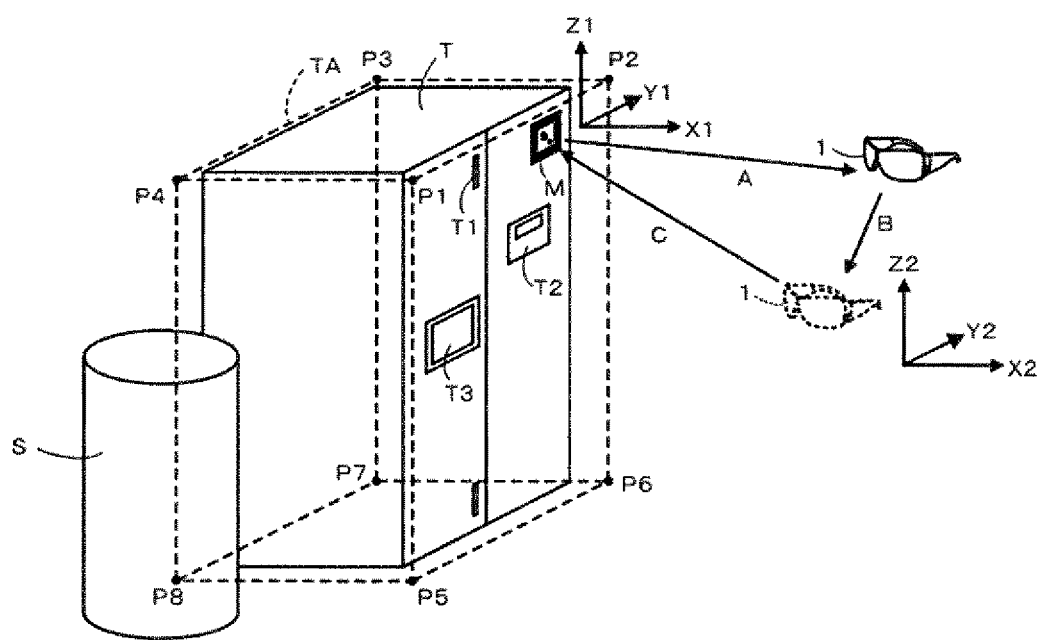
FIG. 2 is an explanatory diagram to illustrate outline operation of the maintenance support system shown in FIGS. 1A to 1C.
Figure 3A:
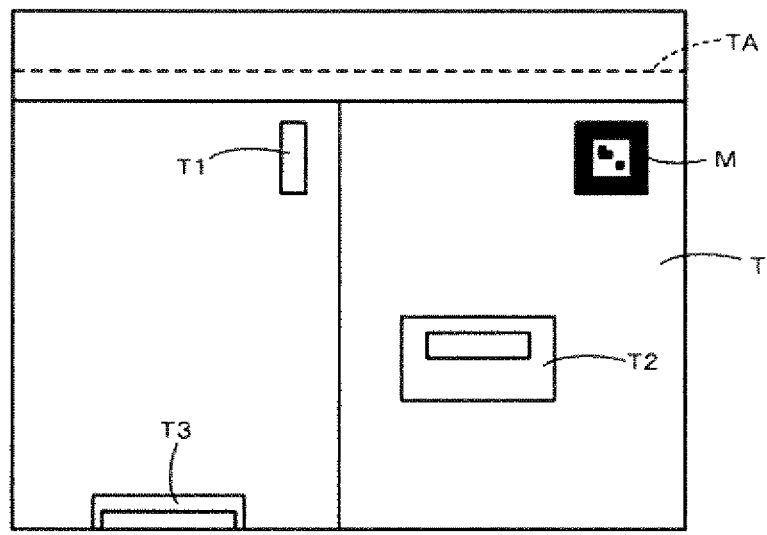
FIGS. 3A and 3B are diagrams to show an example of a captured image acquired by the imaging device in the initial state shown in FIGS. 1A to 1C and an example of a processed image generated by a processed-image generating device.
Figure 3B:
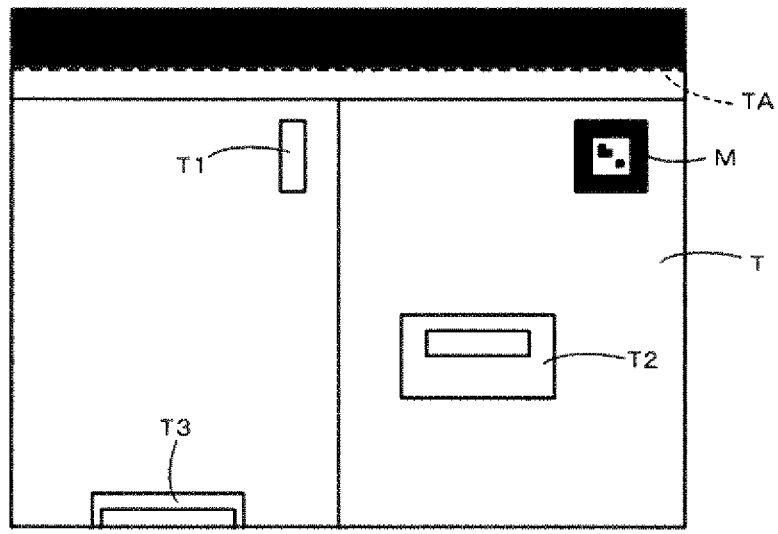
Figure 4A:
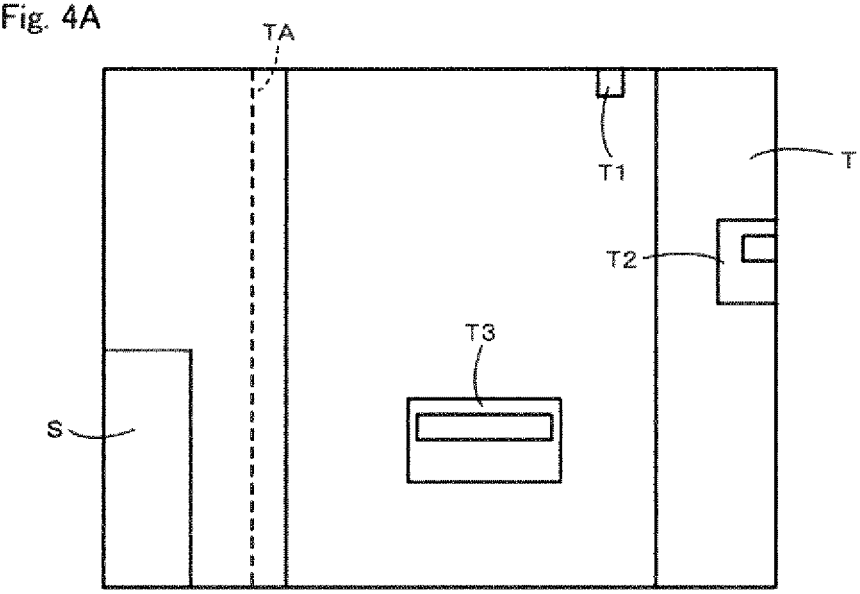
FIGS. 4A and 4B are diagrams to show an example of a captured image acquired by the imaging device in the post-movement state in which the wearable terminal shown in FIGS. 1A to 1C has moved, and an example of a processed image generated by the processed-image generating device.
Figure 4B:
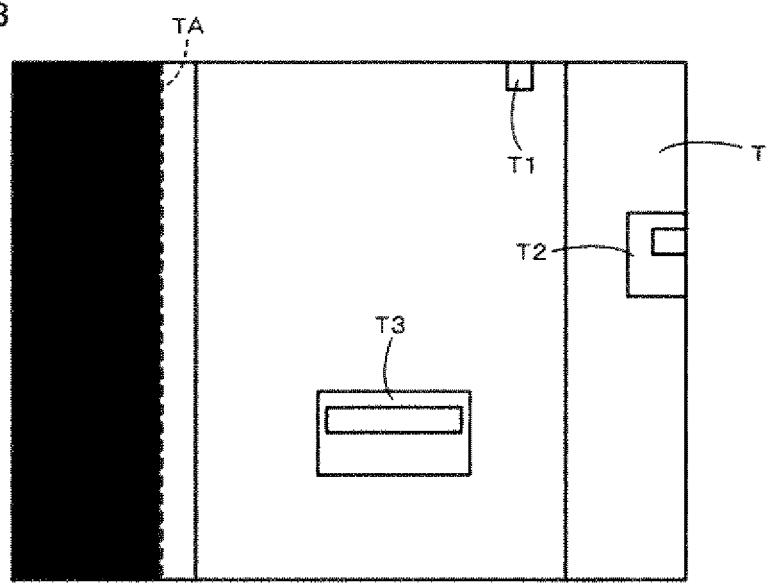

FIG. 2 is an explanatory diagram to illustrate outline operation of the maintenance support system 100 according to the present embodiment. In FIG. 2, the maintenance worker wearing the wearable terminal 1 is not shown. FIGS. 3A and 3B are diagrams to show an example of a captured image acquired by the imaging device 12 in the initial state and an example of a processed image generated by the processed-image generating device 35. FIG. 3A shows an example of a captured image, and FIG. 3B shows an example of a processed image. FIGS. 4A and 4B are diagrams to show an example of a captured image acquired by the imaging device 12 in the post-movement state in which the wearable terminal 1 has moved, and an example of a processed image generated by the processed-image generating device 35. FIG. 4A shows an example of a captured image, and FIG. 4B shows an example of a processed image. Note that, in FIGS. 3A and 3B, a boundary line of a three-dimensional area TA is illustrated by a broken line for convenience of explanation, but the boundary line does not exist in an actual captured image.

As shown in FIG. 2, a marker M that defines a reference point is bonded to the front side of the maintenance target T of the present embodiment. There are also members T1 to T3 provided on the front side of the maintenance target T. Next to the maintenance target T, an apparatus S related to confidential information is disposed.

First, the maintenance worker wearing the wearable terminal 1 moves to a position directly facing the marker M so as to be able to capture an image of the marker M with the imaging device 12 of the wearable terminal 1. Then, the maintenance worker captures an image of the maintenance target T with this imaging device 12 in the initial state (the imaging device 12 included in the wearable terminal 1 shown by a solid line in FIG. 2) to acquire a captured image (video image) as shown in FIG. 3A.

Next, the first identifying device 31 extracts a pixel area corresponding to the marker M by performing predetermined image processing on the captured image thus acquired, and identifies a reference point (for example, a center point of the pixel area) from this pixel area. Then, the first identifying device 31 identifies a predetermined three-dimensional area (for example, a rectangular parallelepiped three-dimensional area) TA including the maintenance target T with reference to the reference point. Specifically, for example, coordinates of each vertex P1 to P8 of the three-dimensional area TA represented by a three-dimensional coordinate system with reference to a reference point (a three-dimensional coordinate system having X1, Y1, and Z1 axes shown in FIG. 2) are stored in association with the identification information represented by a marker M in the first identifying device 31. Then, the first identifying device 31 computes a characteristic quantity of the pixel area corresponding to the marker M, identifies the identification information of the marker M from the characteristic quantity, and identifies the three-dimensional area TA represented by the three-dimensional coordinate system with reference to the reference point based on the coordinates of each vertex P1 to P8 stored in association with identified identification information.

Moreover, it is also possible to adopt a configuration in which the first identifying device 31 directly calculates the coordinates of each vertex P1 to P8 of the three-dimensional area TA represented by the three-dimensional coordinate system (three-dimensional coordinate system having X1, Y1, and Z1 axes) with reference to the reference point by computing the characteristic quantity of the pixel area corresponding to the marker M. That is, the configuration may be such that the marker M has a pattern, etc. corresponding to the coordinates of each vertex P1 to P8, and the coordinates of each vertex P1 to P8 can be calculated by computing the characteristic quantity of the predetermined pattern or the like.

Note that although, in the present embodiment, description has been made on a mode in which a reference point is defined by using a marker M so as to enable high accuracy identification, and the three-dimensional area TA is identified with reference to the reference point, the present invention will not be limited to this. For example, it is also possible to adopt a mode in which an arbitrary point in the captured image displayed on the head-mounted display 13 is clicked by using an AR cursor, and the clicked point is used as the reference point. Moreover, for example, it is also possible to adopt a mode in which each vertex P1 to P8 of the three-dimensional area TA is designated by clicking the captured image displayed on the head-mounted display 13 by using the AR cursor, and any of the vertices is used as the reference point. Further, it is also possible to adopt a mode in which the first identifying device 31 performs predetermined image processing on the captured image to extract a pixel area corresponding to a characteristic site (a corner portion, etc.) of the maintenance target T, and then uses the center of the pixel area as the reference point.

Next, the second identifying device 32 identifies the position of the imaging device 12 in the initial state with respect to the reference point. In other words, the second identifying device 32 identifies from what distance and in which direction the imaging device 12 in the initial state has captured an image of the marker M (identifies those in the three-dimensional coordinate system having X1, Y1 and Z1 axes shown in FIG. 2) with reference to the reference point defined by the marker M. That is, the second identifying device 32 identifies a vector A shown in FIG. 2, which starts at the reference point and ends at the imaging device 12.

Specifically, a range image including the pixel area corresponding to the marker M is acquired by the range image sensor 32a constituting the second identifying device 32. Then, a software portion 32b constituting the second identifying device 32 extracts the pixel area corresponding to the marker M by performing predetermined image processing on the acquired range image, and identifies a position (vector A) of the imaging device 12 in the initial state with respect to the reference point, based on the gray level, position, and shape of the aforementioned pixel area. More specifically, a correlation (calibration curve) between the gray level of the pixel area corresponding to the marker M in the range image and the distance of the imaging device 12, and a correlation (calibration curve) between the characteristic quantity regarding the position and shape of the pixel area corresponding to the marker M in the range image and the direction of the imaging device 12 are stored in advance in a memory constituting the second identifying device 32, and a software portion 32b constituting the second identifying device 32 identifies the position of the imaging device 12 in the initial state with respect to the reference point based on those correlations and the gray level, position and shape of the pixel area corresponding to the marker M in the range image.

Note that in the present embodiment, although the range image sensor 32a is used as the component of the second identifying device 32 to identify the position (vector A) of the imaging device 12 in the initial state with respect to the reference point, the present invention will not be limited to this. For example, it is also possible to adopt a mode in which the second identifying device 32 uses a captured image acquired by the imaging device 12.

Specifically, it is also possible that the second identifying device 32 (the software portion 32b constituting the second identifying device 32) identifies a position (vector A) of the imaging device 12 in the initial state with respect to the reference point based on the size, position and shape of the pixel area corresponding to the marker M in the captured image acquired by the imaging device 12 in the initial state. More specifically, if a correlation (calibration curve) between the size of the pixel area corresponding to the marker M and the distance of the imaging device 12, and a correlation (calibration curve) between a characteristic quantity regarding the position and the shape of the pixel area corresponding to the marker M and the direction of the imaging device 12 are stored in advance in a memory constituting the second identifying device 32, the software portion 32b constituting the second identifying device 32 can identify the position of the imaging device 12 in the initial state with respect to the reference point based on those correlations and the size, position and shape of the pixel area corresponding to the marker M in the captured image.

Next, as a result of that the maintenance worker wearing the wearable terminal 1 moves, the wearable terminal 1 moves as well, and an image of the maintenance target T is captured with the imaging device 12 included in the wearable terminal 1 that has moved (the imaging device 12 included in the wearable terminal 1 illustrated by a broken line in FIG. 2) to acquire a captured image as shown in FIG. 4A. This captured image does not include the pixel area corresponding to the marker M.

Then, when the wearable terminal 1 moves, the third identifying device 33 identifies a change of position from the initial state of the imaging device 12 in the post-movement state. That is, the third identifying device 33 identifies the vector B shown in FIG. 2, which starts at the imaging device 12 in the initial state and ends at the imaging device 12 in the post-movement state.

Specifically, acceleration and angular velocity of the imaging device 12 included in the wearable terminal 1 are detected by the inertial sensor 3 constituting the third identifying device 33. Then, the software portion 33b constituting the third identifying device 33 identifies the change of position from the initial state of the imaging device 12 in the post-movement state by performing computing such as time integration using the detected acceleration and angular velocity of the imaging device 12.

Next, the fourth identifying device 34 first identifies the position of the reference point with reference to the imaging device 12 in the post-movement state based on the position (vector A) of the imaging device 12 in the initial state with respect to the reference point identified by the second identifying device 32, and the change of position (vector B) from the initial state of the imaging device 12 in the post-movement state identified by the third identifying device 33. Specifically, the position of the imaging device 12 in the post-movement state with reference to the reference point is represented by a composite vector of vector A and vector B. Therefore, the position of the reference point with reference to the imaging device 12 in the post-movement state will be identified as inverse vector C (vector that starts at the imaging device 12 after movement and ends at the reference point) of the above-described composite vector shown in FIG. 2.

After identifying the position of the reference point (the inverse vector C) with reference to the imaging device 12 in the post-movement state as described above, the fourth identifying device 34 identifies an effective pixel area corresponding to the three-dimensional area TA in the captured image (see FIG. 4A) acquired by the imaging device 12 in the post-movement state based on the identified position of the reference point (inverse vector C) and the three-dimensional area TA identified by the first identifying device 31.

Specifically, the fourth identifying device 34 first identifies the three-dimensional area TA (a three-dimensional area represented by the three-dimensional coordinate system having X2, Y2, and Z2 axes as shown in FIG. 2) with reference to the imaging device 12 in the post-movement state based on the identified position of the reference point (inverse vector C) and the three-dimensional area TA (a three-dimensional area with reference to the reference point, that is, a three-dimensional area represented by the three-dimensional coordinate system having X1, Y1, and Z1 axes as shown in FIG. 2) identified by the first identifying device 31. In other words, the three-dimensional area TA represented by the three-dimensional coordinate system (X1, Y1, Z1) with reference to the reference point will be represented by the three-dimensional coordinate system (X2, Y2, Z2) with reference to the imaging device 12 in the post-movement state. Since in which portion in the field of view of the imaging device 12 in the post-movement state, the three-dimensional area TA represented by the three-dimensional coordinate system (X2, Y2, Z2) with reference to the imaging device 12 appears, or in other words, to which pixel area in the captured image acquired by the imaging device 12, the three-dimensional area TA corresponds can be identified by geometrical computation, the effective pixel area corresponding to the three-dimensional area TA in the captured image can be identified.

Next, the processed-image generating device 35 generates a processed image (video image) in which a mask pixel area excluding the effective pixel area identified by the fourth identifying device 34 is made invisible for the captured image acquired by the imaging device 12 in the post-movement state. In an example shown in FIG. 4B, an image in which a mask pixel area is dark filled is generated as a processed image. However, the processed image can be, without being limited to this, an image in which only the effective pixel area is cut out from the captured image. Moreover, instead of dark filling the mask pixel area, various modes can be adopted as long as leakage of confidential information, etc. can be prevented such as by making the mask pixel area mosaicked and fogged.

Finally, the communication device 36 transmits a processed image generated by the processed-image generating device 35 to the support terminal 2 through a telecommunication line N. Therefore, as shown in FIG. 4A, even if an apparatus S related to confidential information is visually recognizable in a captured image, on the support terminal 2, as shown in FIG. 4B, only the maintenance target T included in the three-dimensional area TA corresponding to the effective pixel area is visually recognized, and thus it is possible to prevent leakage of confidential information, etc. excluding the maintenance target T.

Note that the third identifying device 33, the fourth identifying device 34, the processed-image generating device 35, and the communication device 36 operate on a captured image acquired by the imaging device 12 in the initial state as shown in FIG. 3A. Thereby, in the processed-image generating device 35, a processed image as shown in FIG. 3B in which the mask pixel area is made invisible will be generated even for a captured image acquired by the imaging device in the initial state, and will be transmitted to the support terminal 2.

Note that if the inertial sensor 33*a*, etc. constituting the third identifying device 33 fails, it becomes not possible to correctly identify the change of position from the initial state of the imaging device 12 in the post-movement state. Accordingly, it becomes not possible to correctly identify an effective pixel area corresponding to the three-dimensional area TA in a captured image acquired by the imaging device 12 in the post-movement state. Consequently, there arises possibility that a generated processed image includes confidential information, etc. excluding the maintenance target T.

Therefore, it is preferable that the processed-image generating device 35 has a function of generating a processed image in which all the pixel areas are made invisible, or the communication device 36 has a function of stopping transmission of the processed image, when the inertial sensor 33*a* or the like fails. Further, at this time, in order for that the maintenance worker can promptly know that failure has occurred in the inertial sensor 33*a* or the like, it is preferable that the fact that failure has occurred is displayed on the head-mounted display 13, or the fact that failure has occurred is notified by voice to the speaker 4.

Note that as the inertial sensor 33*a*, etc., a small-size MEMS sensor, etc. is generally used, and detected values (acceleration and angular velocity in the case of the inertial sensor 33*a*) of the sensor are converted into an electric signal and outputted. For example, when failure such as short circuit of an electric circuit provided in the inertial sensor 33*a*, etc. occurs, there will be no change in the electric signal outputted from the sensor even if the wearable terminal 1 moves. Therefore, by adopting a configuration in which an amount of change per unit time of the electric signal to be outputted is compared with a predetermined threshold, and if the amount of change is not more than the threshold, it is judged that failure has occurred in an inertial sensor 33*a* or the like, it is possible to automatically detect failure of the inertial sensor 33*a* or the like.

The head-mounted display 13 of the present embodiment is configured to be switchable between a state of displaying a captured image on the head-mounted display 13 (specifically, a state where the maintenance worker can directly and visually recognize the maintenance target T via a transmission-type head-mounted display 13 on which nothing is displayed), and a state where a processed image is displayed in a visually recognizable manner on the head-mounted display 13. Specifically, for example, it is possible to adopt a mode in which a switching button (not shown) is provided on a frame 11, and the control-signal processing device 3 controls the head-mounted display 13 to select either one of the states by pressing the switching button.

In a state where a captured image is displayed on the head-mounted display 13 (a state where the maintenance worker can directly and visually recognize the maintenance target T), there is nothing to obstruct the field of view of the maintenance worker, and therefore, it is possible to safely perform maintenance work.

On the other hand, in a state where a processed image is displayed on the head-mounted display 13 in a visually recognizable manner, the maintenance worker can also recognize the processed image transmitted to the support terminal 2. Therefore, the maintenance worker can also confirm that leakage of the confidential information, etc. excluding the maintenance target T is prevented, which gives a sense of relief to the maintenance worker. Note that examples of the state where a processed image is displayed in a visually recognizable manner include: a state where the same image as the processed image transmitted to the support terminal 2 (such as an image in which although the reflected area is the same area as in the captured image, the mask pixel area in the captured image is dark filled, and an image obtained by cutting out only an effective pixel area from the captured image) is displayed; as well as a state where an image obtained by overlaying a boundary line between the mask pixel area and the effective pixel area (boundary line of the three-dimensional area TA) on the captured image is displayed as shown in FIGS. 3A and 4A; and a state where a processed image is reduced in size and displayed on a portion of the display screen.

Note that in the present embodiment, although description has been made on a case as an example in which one three-dimensional area TA is identified for one maintenance target T, the present invention will not be limited to this. For example, when there are a plurality of maintenance targets T, for example, a marker M may be attached to each maintenance target T and a three-dimensional area TA may be identified for each maintenance target T. For example, when the one maintenance target T is a substrate processing apparatus, and parts of the substrate processing apparatus are removed and repair work etc. is performed on a predetermined work desk, another maintenance target T is set to this work desk, and a marker M may also be attached to the work desk.

Further, in the present embodiment, as the three-dimensional area TA, a three-dimensional area having a rectangular parallelepiped shape having eight vertices P1 to P8 has been described as an example, but the present invention will not be limited to this. Depending on the shape of the maintenance target T, it is also possible to set a three-dimensional area TA having a shape other than the rectangular parallelepiped, which is identified by more than eight points.

Further, in the present embodiment, a case in which one wearable terminal 1 is electrically connected to the support terminal 2 has been described as an example, but the present invention will not be limited to this. It is also possible to adopt a configuration in which a plurality of wearable terminals 1 are electrically connected to the support terminal 2.

In this case, it is possible to adopt a configuration in which the imaging devices 12 of the plurality of wearable terminals 1 capture an image of the same marker M and identify the same three-dimensional area TA, or it is also possible to adopt a configuration in which a different marker M to be captured is used or a different three-dimensional area TA is identified, for each wearable terminal 1.

Further, the support terminal 2 can adopt various modes such as one in which the processed images transmitted from the plurality of wearable terminals 1 are displayed side by side at the same time, or the processed images to be displayed are switchable.

Furthermore, it is possible to prepare a plurality of support terminals 2 electrically connected to the wearable terminal 1, regardless of whether the wearable terminal 1 is singular or plural.

Further, in the present embodiment, although an area in close proximity to the maintenance target T is set as the three-dimensional area TA as shown in FIG. 2, the present invention will not be limited to this. For an area in which non-existence of an apparatus S related to confidential information is determined in advance even if it is an area in which the maintenance target T does not exist, it is also possible to further widen the three-dimensional area TA so as to include such area. Further, the three-dimensional area TA will not be limited to one continuous area, and a plurality of separated areas can be set as the three-dimensional area TA.

According to the maintenance support system 100 of the present embodiment described so far, it is possible to perform, for example, maintenance support as described below.

(1) The maintenance supporter visually recognizes a processed image transmitted to the support terminal 2 and identifies numbers of parts constituting the maintenance target T. Alternatively, the maintenance worker and the maintenance supporter converse using a speaker 4 and a microphone 5 of the wearable terminal 1 while visually recognizing a processed image to identify numbers of parts constituting the maintenance target T. Alternatively, based on the voice data of the above-described conversation, the numbers of the parts constituting the maintenance target T are automatically identified by the support terminal 2 (for example, automatically recognized by utilizing AI technology). Alternatively, the numbers of parts constituting the maintenance target T are automatically identified by the support terminal 2 by utilizing, for example, AI technology based on the image data of a transmitted processed image. At the time of identification of the above-described numbers, the identification information of the maintenance target T is represented at the marker, and it is preferable to identify numbers (for example, part numbers and serial numbers) included in a bill of materials (BOM) linked with the identification information of the maintenance target T.

Then, the inventory and delivery date of the part corresponding to the identified number are confirmed by manually or automatically accessing an inventory management system connected to the support terminal 2, and the information is transmitted from the support terminal 2 to the communication device 36 attached to the wearable terminal 1 and displayed on the head-mounted display 13.

Conventional operation has been such that the part numbers and serial numbers of parts constituting the maintenance target T are identified only by conversation between the maintenance worker and the maintenance supporter using a speaker or microphone, and they are noted by handwriting. Then, by manually accessing an inventory management system, the part numbers and serial numbers are inputted with the keyboard to confirm the inventory and delivery date of the corresponding parts. In this conventional operation, there is a risk that human errors in listening and writing of part numbers and serial numbers of parts, and human errors when inputting the numbers to the inventory management system may occur. Moreover, the maintenance support takes time due to manual operation.

However, according to the maintenance support system 100 of the present embodiment, advantages can be achieved in that the above-described human errors will not occur, and the time required for maintenance support will be reduced, particularly when a configuration is adopted in which the part numbers and serial numbers of parts are automatically identified, and the inventory management system is automatically accessed.

(2) In the above-described (1), when arrangement of a replacement part is made, the support terminal 2 automatically creates a work report in which part numbers and serial numbers before replacement are transcribed.

Adopting the above-described configuration leads to improvement of user's work and productivity (added value other than maintenance support). There is also an advantage in that it is possible to collect log data for parts of replacement cycle, and perform recommendation on when replacement thereof is required next time (preventive maintenance).

Note that in the present embodiment, although description has been made on a mode in which a processed image is transmitted to the support terminal 2, the captured image can be transmitted as it is to the support terminal 2 as needed.

REFERENCE SIGNS LIST

1 Wearable terminal
2 Support terminal
3 Control-signal processing device
12 Imaging device
13 Head-mounted display
31 First identifying device
32 Second identifying device
32a Range image sensor
33 Third identifying device
33a Inertial sensor
34 Fourth identifying device
35 Processed-image generating device
36 Communication device
100 Maintenance support system
M Marker
N Telecommunication line
S Apparatus related to confidential information
T Maintenance target
TA Three-dimensional area

The invention claimed is:

1. A maintenance support system comprising:
a wearable terminal including an imaging device and worn by a maintenance worker;
a first identifying device configured to identify a predetermined three-dimensional area including a maintenance target with reference to a predetermined reference point in a captured image acquired by capturing an image of the maintenance target with the imaging device in an initial state;
a second identifying device configured to identify a position of the imaging device in the initial state with respect to the reference point;
a third identifying device configured to identify a change of position from the initial state of the imaging device in a post-movement state in which the wearable terminal has moved;
a fourth identifying device configured to identify a position of the reference point with reference to the imaging device in the post-movement state, based on the position of the imaging device in the initial state with respect to the reference point identified by the second identifying device and on the change of position from the initial state of the imaging device in the post-movement state identified by the third identifying device, and configured to identify an effective pixel area corresponding to the three-dimensional area in a captured image acquired by the imaging device in the post-movement state, based on the identified position of the reference point and on the three-dimensional area identified by the first identifying device;
a processed-image generating device configured to generate a processed image in which a mask pixel area excluding the effective pixel area identified by the fourth identifying device is made invisible for the captured image acquired by the imaging device in the post-movement state; and
a communication device configured to transmit the processed image generated by the processed-image generating device to a support terminal operated by a maintenance supporter.

2. The maintenance support system according to claim 1, wherein
the reference point is defined by a marker attached to the maintenance target.

3. The maintenance support system according to claim 2, wherein
the second identifying device identifies the position of the imaging device in the initial state with respect to the reference point, based on a size, position and shape of a pixel area corresponding to the marker in the captured image acquired by the imaging device in the initial state.

4. The maintenance support system according to claim 2, wherein
the second identifying device includes a range image sensor attached to the wearable terminal and having a substantially same line-of-sight direction as the imaging device, and identifies the position of the imaging device in the initial state with respect to the reference point based on a gray level, position and shape of a pixel area corresponding to the marker in a range image acquired by the range image sensor.

5. The maintenance support system according to claim 1, wherein
the third identifying device includes an inertial sensor attached to the wearable terminal.

6. The maintenance support system according to claim 1, wherein
the wearable terminal includes a head-mounted display, and
the head-mounted display is configured to be switchable between a state where the captured image is displayed on the head-mounted display and a state where the processed image is displayed in a visually recognizable manner on the head-mounted display.

7. The maintenance support system according to claim 1, wherein
the first identifying device, the second identifying device, the third identifying device, the fourth identifying device, the processed-image generating device, and the communication device are attached to the wearable terminal.

8. The maintenance support system according to claim 1, further comprising:
the support terminal, wherein
the support terminal is configured to be capable of bidirectional data communication with the communication device.

9. The maintenance support system according to claim 1, wherein the reference point is not necessarily included in the captured image acquired by the imaging device in the post-movement state.

10. The maintenance support system according to claim 1, wherein the maintenance target is industrial equipment.

11. A maintenance support method by use of a wearable terminal including an imaging device and worn by a maintenance worker, the maintenance support method comprising:
a first identifying step of identifying, by a first identifying device, a predetermined three-dimensional area including a maintenance target with reference to a predetermined reference point in a captured image acquired by capturing an image of the maintenance target by the imaging device in an initial state;
a second identifying step of identifying, by a second identifying device, a position of the imaging device in the initial state with respect to the reference point;
a third identifying step of identifying, by a third identifying device, a change of position from the initial state of the imaging device in a post-movement state in which the wearable terminal has moved;
a fourth identifying step of identifying: by a fourth identifying device, a position of the reference point with reference to the imaging device in the post-movement state, based on the position of the imaging device in the initial state with respect to the reference point identified in the second identifying step, and on the change of position from the initial state of the imaging device in the post-movement state identified in the third identifying step; and identifying an effective pixel area corresponding to the three-dimensional area in a captured image acquired by the imaging device in the post-movement state, based on the identified position of the reference point and on the three-dimensional area identified in the first identifying step;
a processed-image generating step of generating, by a processed-image generating device, a processed image in which a mask pixel area excluding the effective pixel area identified in the fourth identifying step is made invisible for the captured image acquired by the imaging device in the post-movement state; and
a communication step of transmitting the processed image generated in the processed-image generating step to a support terminal operated by a maintenance supporter, by a communication device.

12. A non-transitory computer readable storage medium in which a program is stored, wherein the program for causing the first identifying device, the second identifying device, the third identifying device, the fourth identifying device, the processed-image generating device, and the communication device to respectively execute the first identifying step, the second identifying step, the third identifying step, the fourth identifying step, the processed-image generating step, and the communication step included in the maintenance support method according to claim 11.

* * * * *